//UNITED STATES PATENT//

[19] Keil

[11] 3,926,885
[45] Dec. 16, 1975

[54] SILOXANE-MODIFIED EPOXY RESIN COMPOSITIONS

[75] Inventor: Joseph W. Keil, Midland, Mich.

[73] Assignee: Dow Corning Corporation, Midland, Mich.

[22] Filed: Dec. 23, 1974

[21] Appl. No.: 535,623

[52] U.S. Cl. .... 260/29.1 SB; 260/33.6 EP; 260/33.6 SB; 260/33.8 EP; 260/33.8 SB; 260/37 EP; 260/37 SB; 260/824 EP; 260/830 R
[51] Int. Cl.² .......................................... C08L 63/00
[58] Field of Search ... 260/29.1 SB, 37 EP, 824 EP, 260/33.6 EP

[56] References Cited
UNITED STATES PATENTS

| | | |
|---|---|---|
| 3,356,758 | 12/1967 | Omietanski et al. ...... 260/824 EP X |
| 3,511,788 | 5/1970 | Keil ............................ 260/824 EP X |
| 3,555,063 | 1/1971 | Nakajima et al. .......... 260/824 EP X |

*Primary Examiner*—Lewis T. Jacobs
*Attorney, Agent, or Firm*—Jack E. Moermond

[57] ABSTRACT

Self-lubricated epoxy resins are obtained by molding and curing liquid polyepoxides containing diorganopolysiloxanes dispersed therein, uniform dispersions being formed with the aid of certain polydimethyl-siloxane-organic copolymers.

13 Claims, No Drawings

SILOXANE-MODIFIED EPOXY RESIN COMPOSITIONS

The present invention relates to curable blends of epoxy resins and organopolysiloxanes. In one aspect, the invention relates to cured epoxy resins having modified surface properties. In another aspect, the invention relates to a cured epoxy resin composite which has self-lubricating properties.

Epoxy resins are well known for their valuable properties, such as chemical inertness, heat resistance, good adhesion and good electrical resistance. The polyepoxide resins are widely used as adhesives, encapsulating compounds and the like. When cast or molded, the cured epoxy resins exhibit a relatively high coefficient of friction. Other polymers, such as polytetrafluoroethylene, polyacetates and nylon, exhibit low coefficients of friction and find use in applications in which this self-lubrication characteristic is desirable. It would also be advantageous to increase to hydrophobicity and release characteristics of epoxy coatings and molding compounds. Because of the epoxy resins's chemical resistance, strength, and abrasion resistance, a polyepoxide material having improved surface characteristics would find use in a variety of new applications.

Thus, it is an object of the present invention to provide an epoxy resin composition which when cured exhibits a low coefficient of friction.

It is another object of the invention to provide a stable dispersion of a liquid epoxy resin and a fluid organopolysiloxane lubricant.

A further object of the invention is to provide an epoxy resin composition which, when cured, exhibits modified surface properties. These and other objects of the invention will be apparent to one skilled in the art upon reading the following disclosure and claims.

In accordance with the invention, there is provided a homogeneous dispersion comprising (a) from about 55 to 95 percent by weight of a curable epoxy resin composition; (b) from about 4 to 35 percent by weight of a fluid lubricant which is incompatible with the epoxy resin composition, the fluid having a viscosity in the range of 20 to 20,000,000 cs. at 25°C.; (c) from about 1 to 10 percent by weight of a dispersing agent capable of maintaining (b) dispersed in (a), the dispersing agent being a siloxane copolymer selected from the group consisting of (1) polydimethylsiloxane-organic copolymers in which the polydimethylsiloxane portion has a molecular weight of at least 1,500 and the organic portion consists essentially of a polyoxyethylene polymer, a polyoxypropylene polymer, or a polyoxyethylene-polyoxypropylene copolymer said organic portion having a molecular weight of at least 500 and said organic portion being attached to silicon atoms via silicon-carbon bonds, and (2) polydimethylsiloxane-organic copolymers which are reaction products produced by heating a mixture of a polydimethylsiloxane containing silicon bonded hydrogen atoms having a molecular weight of at least 1,500, and a hydroxylated polyoxyethylene polymer, a hydroxylated polyoxypropylene polymer, or a hydroxylated polyoxyethylene-polyoxypropylene copolymer, said hydroxylated polyoxyalkylene polymer having a molecular weight of at least 500.

As used herein "curable epoxy resin" is defined as an epoxide and a curing agent therefor. The epoxide may be saturated or unsaturated, cycloaliphatic, aromatic, heterocyclic or aliphatic, and may be substituted if desired with chlorine atoms, hydroxyl groups, ether radicals and the like. They may be monomeric or polymeric. The epoxy compounds have an average of more than one 1,2-epoxide group per molecule which may be present as an interior or terminal group. These epoxy resins which are liquid at room temperature are most preferred for utilization in the dispersions of the invention. Of course, normally solid resins can be used if the dispersion is formed at elevated temperatures or in the presence of a solvent.

Epoxy resins which may be used in these compositions include, for example, polyglycidyl esters, such as those obtainable by the reaction of di- or poly-carboxylic acid with epichlorohydrin or glycerol dichlorohydrin in the presence of an alkali. Such polyglycidyl esters may be derived from aliphatic dicarboxylic acids, e.g., oxalic acid, succinic acid, glutaric acid, adipic acid, pimelic acid, suberic acid, azelaic acid, sebacic acid, or dimerised or trimerised linoleic acid, but are preferably derived from aromatic dicarboxylic acids such as phthalic acid, isophthalic acid, terephthalic acid, naphthalene-2,6-dicarboxylic acid, diphenyl-o,o'-dicarboxylic acid and ethylene glycol bis(p-carboxyphenyl)ether. Such specific polyglycidyl esters, are for example, diglycidyl phthalate, diclycidyl adipate and those diglycidyl esters which correspond to the average formula:

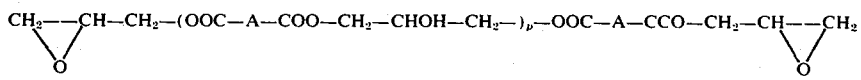

in which A represents a divalent aromatic hydrocarbon radical, such as a phenylene group, and p represents a small, whole or fractional number.

Other epoxy resins which may be used include polyglycidyl ethers, such as those obtainable by the interaction of a dihydric or polyhydric alcohol or a dihydric or polyhydric phenol with epichlorohydrin or a related substance (for example, glycerol dichlorohydrin) under alkaline conditions or, alternatively, in the presence of an acidic catalyst with subsequent treatment with alkali. These compounds may be derived from diols or polyols, such as ethylene glycol, diethylene glycol, triethylene glycol, propane-1,2-diol, propane-1,3-diol, butane-1,4-diol, pentane-1,5-diol, hexane-1,6-diol, hexane-2,4,6-triol, glycerol or N-aryldialkanolamines such as N-phenyldiethanolamine, or preferably, from dihydric or polyhydric phenols such as resorcinol, catechol, hydroquinone, 1,4-dihydroxynaphthalene, 1,5-dihydroxynaphthalene, bis(4-hydroxyphenyl)methane, bis(4-hydroxyphenyl)methylphenylmethane, bis(4-hydroxyphenyl)-tolymethanes, 4,4'-dihydroxydiphenyl, bis(4-hydroxyphenyl)sulphone and, especially, 2,2-bis(4-hydroxyphenyl)propane or phenolformaldehyde condensation products.

There may further be employed aminopolyepoxides such as are, for example, obtained by the dehydrohalogenation of the reaction products of epihalohydrins and primary or disecondary amines such as aniline, n-butylamine or bis(4-methylaminophenyl)methane, and products obtained by the partial or complete epoxidation of cyclic or acyclic polyolefins.

Especially suitable epoxy resins are those obtained from 2,2-bis(4-hydroxyphenyl)propane which have an epoxide content of about 3.8 to 5.88 epoxide equivalents per kilogram.

As curing agents to be used in the epoxy resin compositions of the present invention there may be mentioned those conventionally employed as cross-linking agents for epoxy resins, for example amines containing at least two hydrogen atoms directly attached to nitrogen, e.g., aliphatic and aromatic primary and secondary amines such as mono- and di-butylamine, p-phenylenediamine, bis(p-aminophenyl)methane, ethylenediamine, N,N-diethylethylenediamine, diethylenetriamine, tetra(hydroxyethyl)-diethylenetriamine, triethylenetetramine, tetraethylene-pentamine, piperidiene, guanidine, and guanidine derivatives, such as phenylguanidine and diphenylguanidine, dicyandiamide, anilineformaldehyde resins, polymers of aminostyrenes, and polyamino-amides, e.g., those prepared from aliphatic polyamines and diversed or trimerised unsaturated fatty acids; isocyanates and isothiocyanates; polyhydric phenols, e.g., resorcinol, hydroquinone, 2,2-bis(4-hydroxyphenyl)propane, phenol-aldehyde resins and oil-modified phenol-aldehyde resins; reaction products of aluminum alkoxides or phenolates with tautomeric-reacting compounds of the acetoacetic ester type; Friedel-Crafts catalysts, e.g., $AlCl_3$, $SnCl_4$, $ZnCl_2$, $BF_3$, and their complexes with organic compounds; phosphoric acid; and polycarboxylic acids and their anhydrides, e.g., phthalic anhydride, methylenedimethylene-tetrahydrophthalic anhydride, dodecenylsuccinic anhydride, hexahydrophthalic anhydride, hexachloroendomethylene-tetrahydrophthalic anhydrides or endomethylenetetrahydrophthalic anhydrides, or their mixtures, or maleic or succinic anhydrides.

There may also be used catalytic hardeners, e.g., tertiary amines such as 2,4,6-tris(dimethylaminomethyl) phenol, triethanolamines, or N-benzyldimethylamines; alkali metal alkoxides of alcohols such as 2,4-dihydroxy-3-hydroxymethylpentane; stannous salts of alkanoic acids, such as stannous octoate; aluminum alkoxides; and triphenylphosphine.

The fluid lubricant component of the dispersion is incompatible with the epoxy resin composition. If compatible lubricants were used, one would obtain a solution rather than a dispersion and the resin would be plasticized by the lubricant. In the dispersion of the invention, the lubricant is dispersed as discrete particles throughout the epoxy phase and when the resin is cured, the fluid lubricant is then available to perform its function of reducing the coefficient of friction.

As a general rule, the polar lubricants, such as the polyethers, are solvated by epoxy resins and are not useful in the practice of the invention. Suitable fluid lubricants include paraffinic and mixed base mineral oils of lubricating oil viscosity, for example those having a viscosity range of from 50 SUS at 100°F. to 250 SUS at 210°F.; polymerized olefins, such as polypropylene and polybutene; chlorofluorocarbon oils, such as the linear polymers of recurring -$CF_2CFCl$- units; and organopolysiloxane lubricants such as dimethylpolysiloxane.

The useful fluid organopolysiloxane lubricants are of the general formula $R_aSiO_{4-a/2}$ wherein a has a value of 2 or 3 and can be represented as hydroxyl-endblocked linear polymers or as polymers of the formula $R_3SiO$-$[R_2SiO]_n$-$SiR_3$. Each R is independently selected from the group consisting of the hydrogen atom; lower alkyl radicals such as the methyl, ethyl, butyl and hexyl groups; the phenyl radical and the 3,3,3-trifluoropropyl radical. Illustrative of such organopolysiloxanes are:

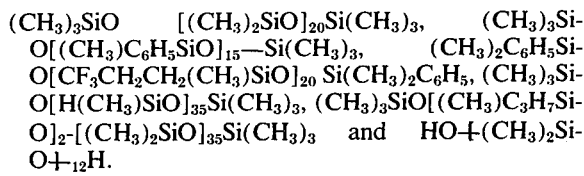

Although the higher viscosity siloxanes are operable in the practice of the invention, it is sometimes necessary to use a solvent in forming the dispersion. Thus, it is preferred to utilize the lower viscosity materials; i.e., those having a viscosity of less than 20,000 cs. at 25°C., because of the ease with which they can be dispersed in the epoxy resin.

The third component of the composition of the invention functions to maintain discrete particles of the fluid lubricant (b) dispersed throughout the epoxy resin (a). Two types of siloxane copolymers have been found which will serve this purpose. One silicone dispersing agent useful in this invention is a polydimethylsiloxane-organic copolymer in which the polydimethylsiloxane portion has a molecular weight of at least 1,500 and the organic portion consists essentially of a polyoxyethylene polymer, a polyoxypropylene polymer or a polyoxyethylene-polyoxypropylene copolymer, said organic portion having a molecular weight of at least 500 and said organic portion being attached to silicon atoms via silicon-carbon bonds. It is believed that when the molecular weights of the siloxane and organic portions fall below those specified above that the lubricants cannot be properly dispersed in the epoxy resins.

The other silicone dispersing agent useful in this invention is a polydimethylsiloxane-organic copolymer which is a reaction product produced by heating a mixture of a polydimethylsiloxane containing silicon bonded hydrogen atoms having a molecular weight of at least 1500, and a hydroxylated polyoxyalkylene polymer selected from the group consisting of hydroxylated polyoxyethylene polymers, hydroxylated polyoxypropylene polymers and hydroxylated polyoxyethylene-polyoxypropylene copolymers, said hydroxylated polyoxyalkylene polymer having a molecular weight of at least 500. It is believed that the reaction upon heating takes place between the silicon bonded hydrogen atoms of the polydimethylsiloxane and the hydroxyl groups of the polyoxyalkylene. Formation of the reaction product is facilitated by the use of a catalyst known to promote the SiH-carbinol condensation reaction, examples of such catalysts being chloroplatinic acid and metal salts such as stannous octoate. The comments with regard to the molecular weight limitations set forth above with respect to the first silicone dispersing agent are equally applicable here.

While the dispersing agents of this invention are believed to be per se novel, analogous polymers are well known in the field of silicone chemistry as well as the means for preparing such polymers and hence no such details are given here as they are well known to the artisan.

For best results it is believed at this time that a dispersing agent of this invention should contain from about 9 to 91 percent by weight of polydimethylsiloxane with data at this time indicating that about 45 percent by weight polydimethylsiloxane is optimum for most useages.

The dispersions of the invention can be prepared by simply mixing the three components in the correct proportions. The lubricant can be weighed into a container with the dispersing agent then being stirred in with the epoxy resin being added to the stirred mixture. If the resin is solid at room temperature, the mixture can be heated. Solvents for the resin or high viscosity fluids can be used in preparing the dispersion and can be removed by heating the mixture. If the curing agents or catalytic hardeners or the epoxy resin composition are active at room temperature or at the temperatures utilized in preparing the dispersion, such materials should be added just prior to molding or casting the composition.

The fluid lubricant (b) and dispersing agent (c) are added in amounts in the stated ranges, but the optimum amounts will be determined by the end use of the cured composite article. There is a sacrifice of physical strength as greater amounts of lubricant are added. More than 35 weight percent fluid lubricant can be dispersed in the resin but there is no corresponding increase in surface lubricity. The nature of lubricant and the amount of dispersing agent will determine the size of the dispersed fluid particles. Generally, the particle size is in the range of from 0.5 to 25 microns, although particles as small as 1,000 A have been observed.

Various types of inert pigments and fillers may be incorporated in the above-described epoxy dispersions. Weatherability of coatings or articles formed from the dispersions can be improved by adding small amounts of the $(CH_3)_3SiO_{1/2}$ $SiO_2$ copolymer described in U.S. Pat. No. 2,676,182. Exemplary of solid inorganic particulate fillers are talc, diatomaceous earth, silica aerogel, alumina, mica, asbestos and the like. Suitable pigments include titanium oxide, carbon black and nonreactive organic coloring materials. The amount of filler or pigment added to the dispersion will vary with the end use of cured resin article, but in no case should the filler content be so great that the particles do not remain suspended in the dispersion. Hydrated alumina particles have been added in amounts up to 140 parts by weight per 100 parts of the dispersion of the invention without rendering the dispersion unstable. Conventional additives, such as flame retardants, plasticizers, antioxidants, antichalking agents and the like can also be utilized.

The epoxy dispersion can be cast or molded and then cured by conventional methods. The epoxy compositions of the invention can also be used to impregnate glass cloth in the preparation of laminates or as coatings on various substrates, such as metal, wood, stone, paper and the like.

When cured, either at room temperature or by heating depending on the hardener system, the dispersions of the invention provide a rigid epoxy resin matrix containing discrete particles of the fluid lubricant dispersed therein. These particles can be considered as approximately spherical, uniformly distributed throughout the matrix, ranging in size from about 0.5 to 25 microns and containing a mixture of the lubricant and dispersing agent. This composite article exhibits surface lubricity and hydrophobicity. Because the lubricant is dispersed throughout the matrix, these properties are retained in the face of abrasion or erosion and the composite article is easily machined to any desired shape.

Thus, composite articles comprising a cured epoxy resin matrix containing uniformly dispersed therein discrete fluid particles, the fluid consisting essentially of a mixture of about 30 to about 95 weight percent of a fluid lubricant which is incompatible with the epoxy resin in its uncured state, the remainder of the mixture being a siloxane copolymer selected from the group consisting of (1) polydimethylsiloxane-organic copolymers in which the polydimethylsiloxane portion has a molecular weight of at least 1,500 and the organic portion consists essentially of a polyoxyethylene polymer, a polyoxypropylene polymer, or a polyoxyethylene-polyoxypropylene copolymer said organic portion having a molecular weight of at least 500 and said organic portion being attached to silicon atoms via silicon-carbon bonds, and (2) polydimethylsiloxane-organic copolymers which are reaction products produced by heating a mixture of a polydimethylsiloxane containing silicon bonded hydrogen atoms having a molecular weight of at least 1,500, and a hydroxylated polyoxythylene polymer, a hydroxylated polyoxypropylene polymer, or a hydroxylated polyoxyethylene-polyoxypropylene copolymer, said hydroxylated polyoxyalkylene polymer having a molecular weight of at least 500; are within the scope of the present invention. The fluid particles comprises from about 4 to 35 weight percent of the cured composite article.

As with the dispersions, fillers and pigments can be present in the composite article. Filled composites containing hydrated alumina are especially useful as insulators for high voltage transmission systems. Bearing members and gears fabricated from this composite material have special utility in devices requiring some degree of permanent lubrication.

Now in order that those skilled in the art may better understand how the present invention can be practiced, the following examples are given by way of illustration and not by way of limitation. All parts and percents referred to herein are by weight and all viscosities measured at 25°C. unless otherwise specified.

EXAMPLE 1

A mixture composed of 10g. of a siloxane copolymer consisting of about 105 $(CH_3)_2SiO$ units, about 11 $H(CH_3)SiO$ units, about 0.5 $(CH_3)_3SiO_{1/2}$ units and about 1.5 $H(CH_3)_2SiO_{1/2}$ units and having a molecular weight of about 8,500, 90g. of a polypropylene glycol monol homopolymer having a molecular weight of about 4,100 (Ucon LB 1715), 100g. of xylene, and 10 drops of a 1 molar solution of $H_2PtCl_6 \cdot 6H_2O$ in isopropanol was refluxed for 2 hours under nitrogen to obtain a polydimethylsiloxane-organic copolymer in which the organic portion is attached to the silicon atoms via silicon-oxygen-carbon bonds.

A mixture was prepared which consisted essentially of 1 g. of the above prepared polydimethylsiloxane-organic copolymer, 3g. of a 1000 cs. trimethylsilyl endblocked polydimethylsiloxane fluid, and 7g. of a commercial liquid cycloaliphatic epoxy resin of the formula

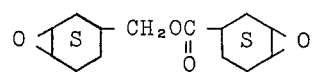

(Ciba-Geigy CY-179). The above prepared polydimethylsiloxane-organic copolymer caused the siloxane fluid to become emulsified in the epoxy resin. This emulsion was very stable showing no oiling or separation after standing for 24 hours at 100°C.

EXAMPLE 2

Three emulsions or dispersions were prepared which consisted essentially of 60 parts of a liquid epoxy resin which was the reaction product of bisphenol A and epichlorohydrin, had an epoxide equivalent in the range of 186–192, a viscosity in the range of 11,000–14,000 cps., and a specific gravity of 1.16 (D.E.R. 331), 40 parts of a 1000 cs. trimethylsilyl endblocked polydimethylsiloxane fluid, and 4 parts of a dispersing agent.

In emulsion (1) the dispersing agent was a polydimethylsiloxane-organic copolymer of the general formula

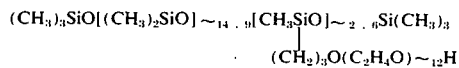

The siloxane portion has a molecular weight of about 1,422 and the glycol portion a molecular weight of about 585. This emulsion was included for purposes of comparison.

In emulsion (2) the dispersing agent was a polydimethylsiloxane-organic copolymer of the general formula

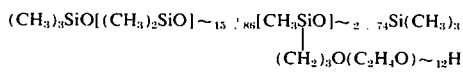

The siloxane portion has a molecular weight of about 1500 and the glycol portion a molecular weight of about 585.

In emulsion (3) the dispersing agent was a polydimethylsiloxane-organic copolymer of the general formula

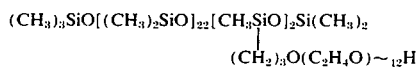

The siloxane portion has a molecular weight of about 1912 and the glycol portion a molecular weight of about 585.

The emulsions were all prepared by simply mixing the three ingredients together on an Eppenbach mixer. These emulsions were tested for stability by allowing them to stand at room temperature. The results are set forth in the table below.

| Stability | Emulsion (1)* | Emulsion (2) | Emulsion (3) |
| --- | --- | --- | --- |
| Initially | Excellent | Excellent | Excellent |
| After 30 minutes | Separated | Excellent | Excellent |
| After 24 hours | 2 Phases | No Separation | No Separation |
| After 72 hours | 2 Phases | 2 Phases | No Separation |
| After 6 weeks | — | — | Very Slight Separation |

*Included for comparison

EXAMPLE 3

Three emulsions were prepared as in the preceding example except that three different dispersing agents were used.

In emulsion (1) the polydimethylsiloxane-organic copolymer dispersing agent had the general formula

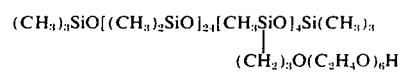

This emulsion was included for comparison.

In emulsion (2) the polydimethylsiloxane-organic copolymer dispersing agent had the general formula

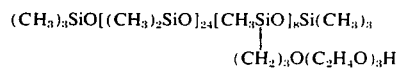

This emulsion was included for comparison.

In emulsion (3) the polydimethylsiloxane-organic copolymer dispersing agent had the general formula

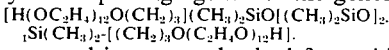

These emulsion were checked for stability, the test results being set forth in the table below.

| Stability | Emulsion (1)* | Emulsion (2)* | Emulsion (3) |
| --- | --- | --- | --- |
| Initially | Very good but rapidly | Very Very Poor | Excellent |
| After 3 hrs. at R.T. | 2 Phases | Very Very Poor but no separation | Excellent |
| After 24 hrs. at R.T. | — | 2 Phases (in <2 days) | Excellent |
| After 7 hrs. at 100°C. | — | — | Excellent |
| After 18 hrs. at 100°C. | — | — | 2 Phases |

*Included for comparison.

EXAMPLE 4

A dispersion was prepared by mixing on an Eppenbach mixer 3g. of a 1000 cs. trimethylsilyl endblocked polydimethylsiloxane fluid, 0.5g. of a dispersing agent of the general formula

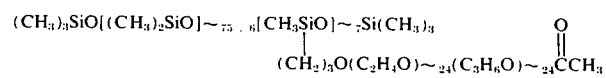

and 7g. of a commercial liquid cycloaliphatic epoxy resin (Ciba-Geigy CY-179). No separation, creaming or oiling of this dispersion had occurred after heating it for 1 hour at 100°C. An identically prepared dispersion, except that it did not contain the dispersing agent, separated completely after heating for less than 1 hour at 100°C.

EXAMPLE 5

Six emulsions or dispersions were prepared which had the following compositions. Emulsion (1) consisted essentially of 80 parts of the liquid epoxy resin of Example 2, 20 parts of a 1000 cs. trimethylsilyl end-blocked polydimethylsiloxane fluid, and 2 parts of a dispersing agent of the general formula

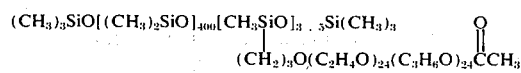

Emulsion (2) was identical to emulsion (1) except that the dispersing agent had the general formula

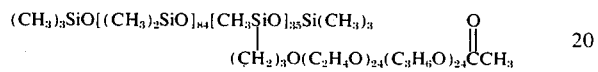

Emulsion (3) consisted essentially of 80 parts of the liquid epoxy resin of Example 2, 20 parts of liquid polybutene (Indopol H25), and 2 parts of a dispersing agent of the general formula

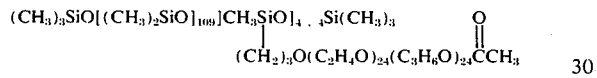

Emulsion (4) was identical to emulsion (3) except that mineral oil (Shellflex 1790) was substituted for the polybutene. Emulsion (5) was identical to emulsion (1) except that the dispersing agent had the general formula

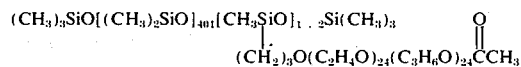

Emulsion (6) was identical to emulsion (1) except that the dispersing agent had the general formula

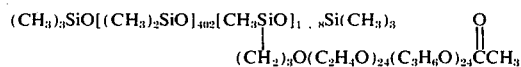

The above emulsions were checked for stability, the results being set forth in the table below.

| Time/Conditions | Emulsion | | | | | |
| --- | --- | --- | --- | --- | --- | --- |
| | (1) | (2) | (3) | (4) | (5) | (6) |
| Initially (Room temp.) | Very good-Excellent | Very good-Excellent | Excellent | Excellent | Good but coalesing | Good but coalesing |
| 24 hrs. (Room temp.) | No Separation | No Separation | Excellent No Separation | Excellent No Separation | No Separation | No Separation |
| 1 hr. at 100°C. | Good Very slight oiling | Excellent | Excellent | Excellent | Good Some oiling | Good Slight oiling |

To 10g. of emulsion (5) there was added 1.05g. of tetraethylenetetraamine and the resulting mixture cured overnight at room temperature and then for 1 hour at 100°C. This mixture cured to a white solid epoxy composite having self-lubricating properties.

That which is claimed is:

1. A homogeneous polymeric dispersion comprising
   a. 55 to 95 weight percent of a curable epoxy resin composition;
   b. 4 to 35 weight percent of a fluid lubricant which is incompatible with the epoxy resin composition, said fluid having a viscosity in the range of 20 to 20,000,000 cs. at 25°C.;
   c. 1 to 10 parts weight percent of a dispersing agent capable of maintaining (b) dispersed in (a), said dispersing agent being a siloxane copolymer selected from the group consisting of
      1. polydimethylsiloxane-organic copolymers in which the polydimethylsiloxane portion has a molecular weight of at least 1,500 and the organic portion consists essentially of a polyoxyethylene polymer, a polyoxypropylene polymer, or a polyoxyethylene-polyoxypropylene copolymer said organic portion having a molecular weight of at least 500 and said organic portion being attached to silicon atoms via silicon-carbon bonds, and
      2. polydimethylsiloxane-organic copolymers which are reaction products produced by heating a mixture of a polydimethylsiloxane containing silicon bonded hydrogen atoms having a molecular weight of at least 1500, and a hydroxylated polyoxyethylene polymer, a hydroxylated polyoxypropylene polymer, or a hydroxylated polyoxyethylene-polyoxypropylene copolymer, said hydroxylated polyoxyalkylene polymer having a molecular weight of at least 500.

2. A dispersion in accordance with claim 1 wherein the dispersing agent (c) is a copolymeric product (1).

3. A dispersion in accordance with claim 1 wherein the dispersing agent (c) is a copolymeric reaction product (2).

4. A dispersion in accordance with claim 1 wherein the fluid lubricant is an organopolysiloxane.

5. A dispersion in accordance with claim 4 wherein the organopolysiloxane lubricant is dimethylpolysiloxane.

6. A dispersion in accordance with claim 4 wherein the organopolysiloxane has a viscosity of not greater then 20,000 cs. at 25°C.

7. A dispersion in accordance with claim 1 which contains a solid inorganic particulate filler.

8. A dispersion in accordance with claim 7 wherein the filler comprises hydrated alumina.

9. A composite article comprising a cured epoxy resin matrix containing uniformly dispersed therein discrete fluid particles, the fluid consisting essentially of a mixture of about 30 to 95 weight percent of a fluid lubricant which is incompatible with the epoxy resin in its uncured state, the remainder of the mixture being a siloxane copolymer selected from the group consisting of 1. polydimethylsiloxane-organic copolymers in which the polydimethylsiloxane portion has a molecular weight of at least 1500 and the organic portion consists essentially of a polyoxyethylene polymer, a polyoxypropylene polymer, or a polyoxyethylenepolyoxypropylene copolymer said organic portion having a molecular weight of at least 500 and said organic portion being attached to silicon atoms via silicon-carbon bonds, and
2. polydimethylsiloxane-organic copolymers which are reaction products produced by heating a mixture of a polydimethylsiloxane containing silicon bonded hydrogen atoms having a molecular weight of at least 1500, and a hydroxylated polyoxyethylene polymer, a hydroxylated polyoxypropylene polymer, or a hydroxylated polyoxyethylene-polyoxypropylene copolymer said hydroxylated polyoxyalkylene polymer having a molecular weight of at least 500, the fluid particles ranging in size from 0.5 to 25 microns and comprising from about 4 to 35 weight percent of the composite article.

10. A composite article in accordance with claim 9 wherein the fluid lubricant is an organopolysiloxane.

11. A composite article in accordance with claim 10 wherein the organopolysiloxane is dimethylpolysiloxane having a viscosity of not greater than 20,000 cs. at 25°C.

12. A composite article in accordance with claim 9 which contains a solid inorganic filler.

13. A composite article in accordance with claim 12 wherein the filler comprises hydrated alumina.

* * * * *